June 29, 1965  A. E. PRICE  3,191,785
RAILWAY HOPPER CARS
Filed Aug. 14, 1963  4 Sheets-Sheet 3
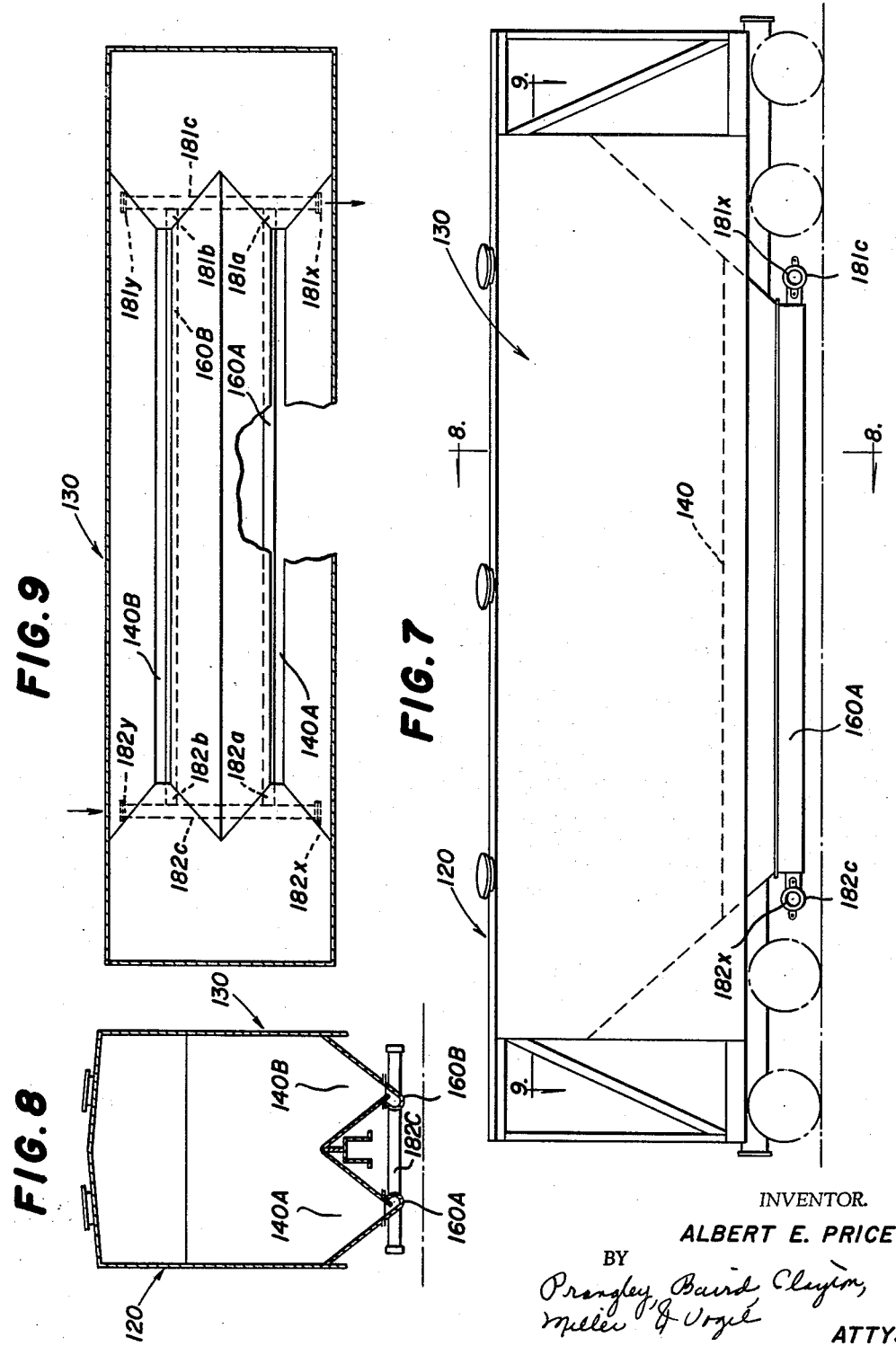
INVENTOR.
ALBERT E. PRICE
BY
Prangley Baird Clayton,
Miller & Vogel
ATTYS.

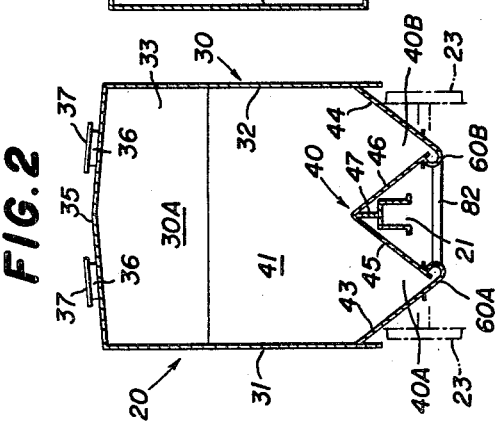

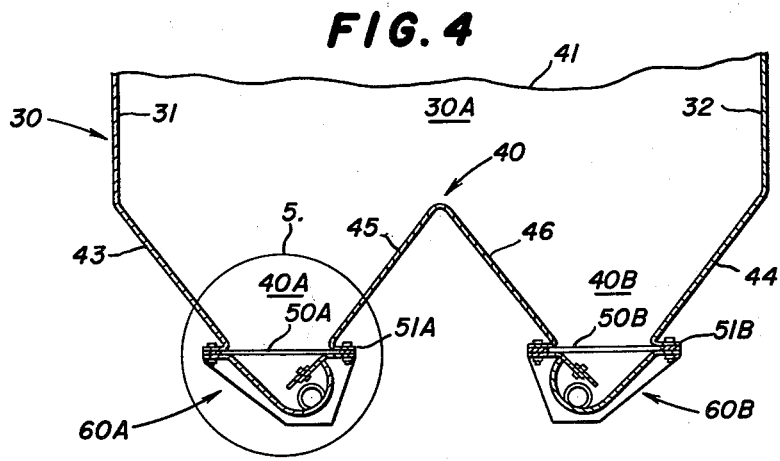
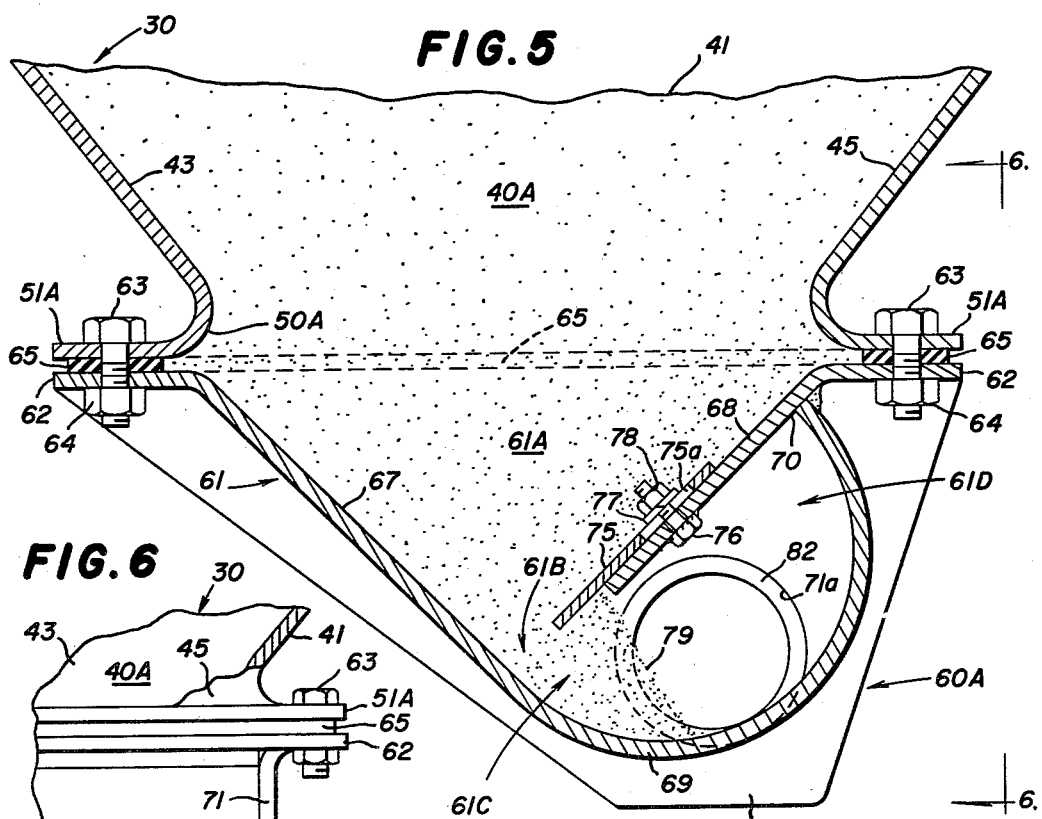

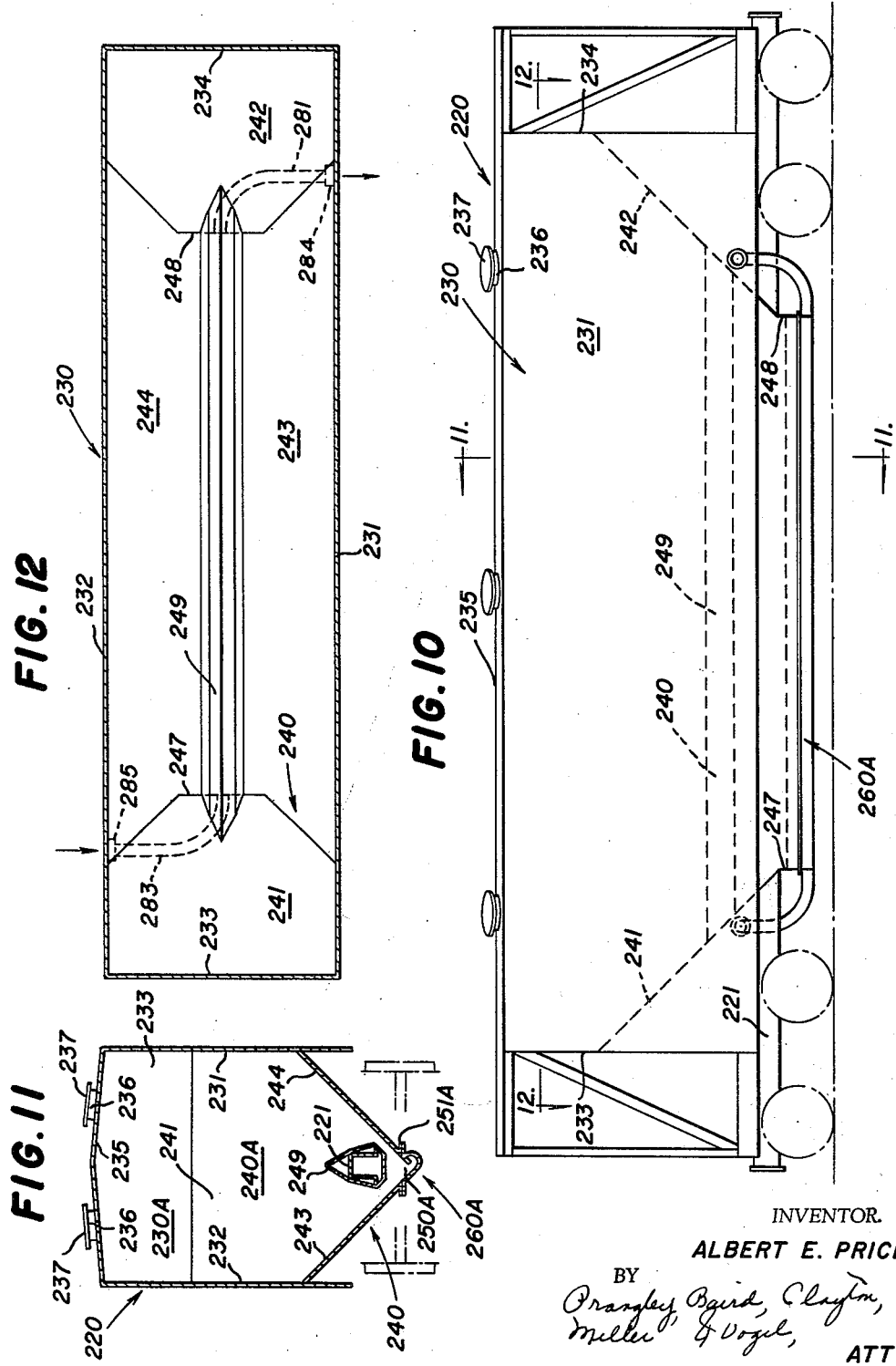

United States Patent Office 3,191,785
Patented June 29, 1965

3,191,785
RAILWAY HOPPER CARS
Albert E. Price, Chicago, Ill., assignor to General American Transportation Corporation, Chicago, Ill., a corporation of New York
Filed Aug. 14, 1963, Ser. No. 302,069
18 Claims. (Cl. 214—83.28)

The present invention relates to railway hopper cars for storage and transportation of finely divided or granular material, such, for example, as flour, malt, plastic resin beads, or the like; and it is the general object of the invention to provide in a railway hopper car, improved and simplified pneumatic unloading mechanism for selectively controlling the unloading to the exterior of the granular material from the car body through a bottom discharge outlet associated with the hopper structure incorporated in the car body.

Another object of the invention is to provide in a railway hopper car, pneumatic unloading mechanism of the character mentioned for selectively controlling the unloading to the exterior of the granular material from the bottom discharge outlet incorporated in the hopper structure, without the necessity of movable valve structure, whereby the overall rate of fall-through of the granular material with respect to the bottom discharge oulet is self-regulating to match the overall rate of transporting of the granular material by the pneumatic unloading mechanism.

A further object of the invention is to provide improved pneumatic unloading mechanism of the character described that incorporates a minimum number of stationary elements of simplified construction and arrangement.

A further object of the invention is to provide improved pneumatic unloading mechanism of the character described, wherein the same may be operated to carry out its normal unloading function, when it is connected either to an air suction main or to an air pressure main, and without requiring any adjustments or settings of the mechanism to accommodate normal operation thereof either with subatmospheric pressure or with superatmospheric pressure.

A further object of the invention is to provide a railway car comprising an elongated longitudinally extending body including bottom structure defining an elongated longitudinally extending communicating hopper and adapted to contain granular material, wherein the hopper has a length commensurate with that of the body between the opposite ends thereof, and elongated longitudinally extending pneumatic unloading mechanism for unloading the granular material from the hopper through an elongated longitudinally extending bottom discharge outlet provided therein, wherein the pneumatic unloading mechanism is of simple and economical construction and arrangement and is operative to unload the granular material from the body substantially uniformly longitudinally therealong and between the opposite ends thereof.

A further object of the invention is to provide a railway car of the character described, wherein the bottom structure of the body defines a pair of elongated longitudinally extending communicating hoppers arranged in side-by-side relation, wherein a pair of the elongated longitudinally extending pneumatic unloading mechanisms are respectively arranged in cooperating relation with the hoppers, and wherein a single conduit system is connected to the mechanisms to effect simultaneous operations thereof and the consequent complete unloading of the hoppers and the communicating body.

A still further object of the invention is to provide a railway car comprising an elongated longitudinally extending underframe including a center sill, an elongated longitudinally extending body carried by the underframe and including bottom structure defining an elongated longitudinally extending communicating hopper and adapted to contain granular material, wherein the hopper has a length commensurate with that of the body between the opposite ends thereof, an elongated longitudinally extending tube enclosing the central portion of the centersill and extending longitudinally through the lower portion of the hopper and above the bottom thereof and laterally inwardly from the sides thereof, wherein the opposite ends of the tube are sealed to the respectively adjacent ends of the hopper so as to isolate the granular material contained in the hopper from contact with the centersill, and wherein the hopper has an elongated longitudinally extending bottom discharge outlet arranged below the tube, and elongated longitudinally extending pneumatic unloading mechanism carried by the bottom of the hopper and operative to unload the granular material from the hopper and the body through the bottom discharge outlet in the hopper.

Further features of the inventon pertain to the particular arrangement of the elements of the railway hopper car and of the pneumatic unloading mechanism therefor, whereby the above-outlined and additional operating features thereof are attained.

The invention, both as to its organization and method of operation, together with further objects and advantages thereof, will best be understood by reference to the following specification, taken in connection with the accompanying drawings, in which:

FIGURE 1 is a side elevational view, partly broken away, of a railway hopper car embodying the present invention;

FIG. 2 is a lateral vertical sectional view of the railway hopper car, this view being taken in the direction of the arrows along the line 2—2 in FIG. 1;

FIG. 3 is a horizontal sectional view of the railway hopper car, this view being taken in the direction of the arrows along the line 3—3 in FIG. 1;

FIG. 4 is an enlarged fragmentary view of the lower portion of the railway hopper car, as shown in FIG. 2;

FIG. 5 is a greatly enlarged view of the lower portion of the railway hopper car, as shown within the circle 5 in FIG. 4, and illustrating the constructional details of the pneumatic unloading mechanism carried by one of the hoppers defined by the bottom structure of the body of the railway hopper car;

FIG. 6 is an enlarged fragmentary side elevational view of the pneumatic unloading mechanism, this view being taken in the direction of the arrows along the line 6—6 in FIG. 5;

FIG. 7 is a side elevational view of a modified form of the railway hopper car;

FIG. 8 is a lateral vertical sectional view of the railway hopper car, this view being taken in the direction of the arrows along the line 8—8 in FIG. 7;

FIG. 9 is a horizontal sectional view of the railway hopper car, this view being taken in the direction of the arrows along the line 9—9 in FIG. 7;

FIG. 10 is a side elevational view of another modified form of the railway hopper car;

FIG. 11 is a lateral vertical sectional view of the railway hopper car, this view being taken in the direction of the arrows along the line 11—11 in FIG. 10; and FIG. 12 is a horizontal sectional view of the railway hopper car, this view being taken in the direction of the arrows along the line 12—12 in FIG. 10.

Referring now to FIGS. 1 to 3, inclusive, of the drawings, the railway hopper car 20, there illustrated and embodying the features of the present invention, is especially adapted for storage and transportation of finely divided or granular materials, such, for example, as flour, malt, plastic resin beads, or the like; and the car 20 comprises a rigid underframe, including an elongated longitudinally extending centersill 21; which underframe is supported adjacent to the opposite ends thereof by a pair of trucks 22 carrying track wheels 23 cooperating with an associated railway track, indicated at 24.

The underframe carries an elongated longitudinally extending substantially box-like body 30, including a pair of elongated longitudinally extending and laterally spaced-apart side walls 31 and 32, a pair of laterally extending and longitudinally spaced-apart end walls 33 and 34, a roof 35, and bottom structure 40. The bottom structure 40 comprises a pair of laterally extending and longitudinally spaced-apart end slope sheets 41 and 42, a pair of elongated longitudinally extending and laterally spaced-apart outer side slope sheets 43 and 44, and a pair of elongated longitudinally extending and laterally spaced-apart central slope sheets 45 and 46. The tops of the end slope sheets 41 and 42 respectively join the bottoms of the end walls 33 and 34 and respectively extend downwardly and longitudinally inwardly therefrom. The tops of the outer side slope sheets 43 and 44 respectively join the side walls 31 and 32 somewhat above the lower ends thereof and respectively extend downwardly and laterally inwardly therefrom. The tops of the central slope sheets 45 and 46 join each other and respectively extend downwardly and laterally outwardly therefrom. The junction between the central slope sheets 45 and 46 is disposed directly above the center line of the centersill 21 and is supported from the centersill 21 by an upstanding elongated longitudinally extending plate 47 arranged therebetween, the central slope sheets 45 and 46 being thus disposed on opposite sides of the centersill 21.

As best shown in FIGS. 2 and 4, the slope sheets 43 and 45 are arranged on one side of the centersill 21 and are disposed in laterally spaced-apart relation and extend downwardly toward each other to define a downwardly converging hopper 40A therebetween that has an elongated longitudinally extending bottom discharge outlet 50A therein, and the slope sheets 44 and 46 are arranged on the other side of the centersill 21 and are disposed in laterally spaced-apart relation and extend downwardly toward each other to define a downwardly converging hopper 40B therebetween that has an elongated longitudinally extending bottom discharge outlet 50B therein. Of course, the end slope sheets 41 and 42 define the opposite ends of the pair of hoppers 40A and 40B. Further, the walls 31, 32, 33 and 34 cooperate with the bottom structure 40 to define a main lading chamber 30A disposed above the hoppers 40A and 40B and commonly communicating therewith. The lower ends of the hoppers 40A and 40B are positioned well below the opposite sides of the centersill 21 and respectively terminate in a pair of elongated longitudinally extending substantially rectangular outwardly directed collars or flanges 51A and 51B respectively surrounding the bottom discharge outlet 50A and 50B.

The hoppers 40A and 40B are thus substantially identical and each thereof has a length that is commensurate with that of the body 30 between the opposite end walls 33 and 34 thereof. Also, as explained more fully hereinafter, the lading chamber 30A may be completely unloaded through the hoppers 40A and 40B via the bottom discharge outlets 50A and 50B therein.

For the purpose of loading the granular material into the lading chamber 30A and the communicating hoppers 40A and 40B, two series of loading hatches 36 are respectively carried by the opposite sides of the roof 35. The hatches 36 are of identical conventional construction; and each thereof comprises a substantially annular tube communicating at the lower end thereof with the top of the lading chamber 30A and provided at the outer end thereof with a surrounding flange that is adapted removably to carry a substantially disk-shaped cover 37. When a hatch cover 37 occupies its closed position with respect to the associated hatch 36, the same hermetically seals the hatch 36, so as to prevent the entry of water, moisture, air, etc., through the closed hatch 36 into the lading chamber 30A in a conventional manner. On the other hand, when a hatch cover 37 occupies its open position, the granular material may be blown or otherwise loaded through the associated open hatch 36 in a conventional manner.

The two hoppers 40A and 40B respectively carry two identical pneumatic unloading mechanisms or devices 60A and 60B. More particularly, as best shown in FIGS. 4, 5 and 6, the device 60A essentially comprises an elongated longitudinally extending hollow casing 61 having a top opening of substantially rectangular configuration and terminating in an upper outwardly directed collar or flange 62 surrounding the top opening mentioned. The collar 62 is substantially congruent with the collar 51A; and the collar 62 is arranged directly below the collar 51A and detachably secured thereto by a series of bolts 63 provided with cooperating nuts 64, the flanges 62 and 61A being arranged in facing relation with a corresponding elongated longitudinally extending resilient sealing gasket 65 of substantially rectangular configuration therebetween. Accordingly, the device 60A is removably carried by the bottom of the hopper 40A by the detachable connection between the flanges 51A and 62 and with the hermetic seal between the flanges 51A and 62 provided by the resilient sealing gasket 65, formed of rubber, or the like; whereby the bottom discharge outlet 50A in the hopper 40A directly communicated with the top opening into the casing 61 through the opening in the sealing gasket 65 and within the surrounding flanges 51A and 62.

Continuing the reference to FIGS. 5 and 6, the casing 61 of the device 60A essentially comprises a pair of elongated longitudinally extending and laterally spaced-apart side walls 67 and 68 respectively joining the tops thereof the adjacent sides of the collar 62 and respectively sloping downwardly and laterally inwardly therefrom to define therebetween and in the upper portion of the casing 61 an elongated longitudinally extending and downwardly converging or tapered funnel 61A; whereby the previously mentioned top opening into the casing 61 comprises the top opening into the funnel 61A. The lower ends of the side walls 67 and 68 are arranged in adjacent laterally spaced-apart relation to define therebetween and in the intermediate portion of the casing 61 an elongated longitudinally extending bottom slot 61B in the funnel 61A. Re-examining this construction, as best shown in FIG. 5, it may be stated that the lower end of the side wall 68 terminates short of its directed intersection with the side wall 67 and that the lower end of the side wall 67 projects downwardly beyond its directed intersection with the side wall 68, thereby to provide the narrow gap or bottom slot 61B therebetween and communicating with the bottom of the funnel 61A. The casing 61 also comprises an elongated longitudinally extending bottom wall 69 having a lateral cross-section that is substantially semicircular or arcuate-shaped. Specifically, one side of the bottom wall 69 projects upwardly to join or form a continuation of the lower end of the side wall 67; and the other side of the bottom wall 69 projects upwardly to join the outer upper intermediate portion of the side wall 68, as indicated at 70; and the intermediate portion of the bottom wall 69 extends laterally in bridging relation between the opposite sides thereof and below the bottom slot 61B and below the lower end of the side wall 68 so as to envelope the lower end of the side wall 68 and to define an elongated longitudinally extending passage 61C–61D in the lower portion of the casing 61. This passage mentioned includes two laterally contiguous and communicating sections 61C and 61D, with the passage section 61C disposed below the bottom slot 61B, and with the passage section 61D disposed in laterally offset relation with the bottom slot 61B. The passage section 61D is thus disposed between the outer side of the enveloped lower portion of the side wall 68 and the adjacent portion of the bottom wall 69, and extends upwardly well above the lower end of the side wall 68 to the previously mentioned junction 70. Thus, the bottom of the casing 61 may be said to be scroll-shaped due to the facts that the lower end of the side wall 67 merges smoothly into the adjacent side of the bottom wall 67 and that the bottom wall 69 then curves back at the other side thereof to join the outer upper intermediate portion of the side wall 68 at the junction 70.

Further, the casing 61 comprises a pair of laterally extending and longitudinally spaced-apart end walls 71 respectively closing the opposite ends of the funnel 61A and the opposite ends of the passage 61C–61D. Specifically, the end walls 71 extend downwardly from the ends of the collar 62; and the elements 67, 68 and 69 extend longitudinally between the end walls 71. In the construction, the end walls 71 project outwardly and downwardly with respect to the adjacent ends of the elements 67, 68 and 69, thereby to reinforce and stiffen the casing 61 disposed between the end walls 71 and below the surrounding collar 62 and to unify the structure of the device 60A.

Also, the upper surface of the side wall 68 carries an elongated longitudinally extending plate-like shutter 75 that is secured in place by an arrangement including a plurality of longitudinally spaced-apart bolts 76 carried by the side wall 68 and projecting through a corresponding plurality of longitudinally spaced-apart and elongated laterally extending slots 75a provided in the shutter 75. The shank of each of the bolts 76 also carries a split clamping washer 77 engaging the adjacent upper surface of the shutter 75 and a nut 78 engaging the adjacent upper surface of the washer 77. Thus, the position of the shutter 75 may be adjusted laterally upon the side wall 68 so as selectively to adjust the effective lateral width of the narrow bottom slot 61B between the lower end of the side wall 68 and the adjacent lower end portion of the side wall 67. Accordingly, the lateral width of the bottom slot 61B may be varied, so as correspondingly to vary the characteristic of the flow of the granular material from the bottom of the funnel 61A through the bottom slot 61B into the adjacent portion of the bottom wall 69 and thus into the adjacent passage section 61C.

In order more clearly to illustrate these relationships, in FIG. 5, granular material has been indicated by the "dots" or "stippled" areas in the bottom of the hopper 40A, in the communicating funnel 61A, and in the communicating passage section 61C; whereby it will be observed that the granular material contained in the passage section 61C assumes an "angle of repose," indicated by the broken line 79; whereby the elongated longitudinally extending plane of the line 79 constitutes the boundary between the communicating and confronting passage sections 61C and 61D. Thus, when the hopper 40A is full of the granular material, the same proceeds by the action of gravity therefrom through the bottom discharge outlet 50A therein and fills the funnel 61A. Also, the granular material falls from the bottom of the funnel 61A through the communicating bottom slot 61B into the passage section 61C; whereby the granular material piles-up in the passage section 61C to fill the same, causing the pile of granular material in the passage section 61C to assume its angle of repose therein, as indicated by the broken line 79. When this occurs, the pile of granular material in the passage section 61C completely fills the same and stoppers the bottom slot 61B, thereby to prevent further flow of granular material from the funnel 61A into the passage section 61C and notwithstanding the substantial head or height of the granular material in the hopper 40A, whereby the "stoppering" mentioned prevents the fall of the pile of granular material from the passage section 61C over into the communicating and confronting passage 61D, with the result that this "stoppering" mentioned prevents the obstruction of the passage section 61D by the granular material; all for a purpose explained below.

Further, the opposite end walls 71 respectively carry two conduits or tubes 81 and 82 respectively disposed at the opposite ends of the casing 61, as best shown in FIG. 1; the inner ends of the conduits 81 and 82 being respectively rigidly secured in place in sealed relation with two parts respectively provided in the two end walls 71 and respectively communicating with the opposite ends of the passage section 61D provided in the casing 61. The opposite ends of the casing 61 are of identical construction; whereby in FIG. 5, it will be observed that the inner end of the conduit 82 is rigidly secured in place in the adjacent port 71a provided in the adjacent end wall 71, as by welding, not shown, so as to produce an hermetic seal therebetween; whereby the open inner end of the conduit 82 directly communicates with the adjacent end of the passage section 61D in the lower portion of the casing 61.

As previously explained, the construction and arrangement of the pneumatic unloading device 60B associated with the hopper 40B are identical to those of the pneumatic unloading device 60A associated with the hopper 40A, as described above; whereby the other end of the conduit 82 is operatively connected to the adjacent end wall of the casing of the device 60B, and a conduit 83 is operatively connected to the opposite end wall of the casing of the device 60B. Thus, as shown in FIGS. 1 and 2, the devices 60A and 60B are connected in series relation by the associated conduit system, including the three conduits 81, 82 and 83. The outer end of the conduit 81 terminates in a fixture 84 carried by the side wall 31 of the body 30; and the outer end of the conduit 83 terminates in a fixture 85 carried by the side wall 32 of the body 30. The two fixtures 84 and 85, although arranged adjacent to the same end of the body 30, are disposed on opposite sides thereof and are readily accessible from the exterior, so as to accommodate unloading of the granular material from either side of the body, as explained more fully below. The fixtures 84 and 85 are identical and of any conventional type, such, for example, as that disclosed in U.S. Patent No. 3,088,778, granted on May 7, 1963 to Edmund R. Aller. Thus, the fixture 84 etc., is of the quick-detachable type and is adapted to connect selectively either a closure and sealing cap or an unloading main connector, as explained more fully below.

Now assume that the body 30 contains a cargo or shipment of the granular material, that the hatch covers 37 occupy their closed and sealed positions, and that the fixtures 84 and 85 carry the closing and sealing caps, not shown. The body 30 may be unloaded from either side thereof and employing indiscriminately either a subatmospheric unloading system or a superatmospheric unloading system.

First, assuming that the body 30 is to be unloaded at the fixture 85 employing a subatmospheric unloading system, the two caps are removed from the two fixtures 84 and 85; the air suction main, not shown, is connected to the fixture 84; and an air filter device, not shown, may be connected to the fixture 85. When operative of the air suction apparatus connected to the air suction main is initiated, the resulting subatmospheric pressure appearing in the fixture 84 causes atmospheric air to be drawn through the filter device into the fixture 85. The air flows in a current from the fixture 85, via the conduit 83, through the device 60B, via the conduit 82, through the device 60A, and via the conduit 81 into the fixture 84; and from the fixture 84 the air current flows into the suction main; and the devices 60B and 60A operate to effect unloading of the granular material from the respective hoppers 40B and 40A and consequently from the communicating lading chamber 30A.

The unloading of the body 30 at the fixture 85 employing the subatmospheric unloading system is substantially identical to that described above, except the connections of the air suction main and the filter device are reversed with respect to the fixtures 85 and 84, in an obvious manner. However, it is noted that the reversal of the direction of the air current through the devices 60B and 60A is of no consequence in the operation thereof to effect the unloading of the granular material from the respective hoppers 40B and 40A, as described above.

Next, assuming that the body is to be unloaded at the fixture 84 employing a superatmospheric unloading system: the two caps are removed from the two fixtures 84 and 85; the air pressure main, not shown, is connected to the fixture 85; and a delivery conduit, not shown, is connected to the fixture 84. When operation of the air pressure apparatus connected to the air pressure main is initiated, the resulting superatmospheric pressure appearing in the fixture 85 causes the compressed air to flow in a current from the fixture 85 via the conduit 83, through the device 60B, via the conduit 82, through the device 60A, and via the conduit 81 into the fixture 84; and from the fixture 84 the air current flows into the delivery conduit; and the devices 60B and 60A operate to effect unloading of the granular material from the respective hoppers 40B and 40A and consequently from the communicating lading chamber 30A.

The unloading of the body 30 at the fixture 85 employing the superatmospheric unloading system is substantially identical to that described above, except the connections of the air pressure main and the delivery conduit are reversed with respect to the fixtures 85 and 84, in an obvious manner. However, it is noted that the reversal of the direction of the air current through the devices 60B and 60A is of no consequence in the operation thereof to effect the unloading of the granular material from the respective hoppers 40B and 40A, as described above.

Referring now to FIG. 5, and considering the details of operation of the pneumatic unloading device 60A, it may be assumed that a current of air is moving longitudinally through the passage section 61D and thence into the conduit 82, as there illustrated; whereby the longitudinally moving air current sweeps the face of the pile of granular material along the elongated longitudinally extending plane of the broken line 79, with the result that the granular material all along this face of the pile confronting the moving air current is entrained or picked-up by the moving air current, so that the entrained granular material is transported or carried with the air current into the conduit 82. Thus, the longitudinally moving air current unloads the granular material all along the longitudinal extent thereof from the pile and consequently from the passage section 61C, with the result that the granular material in the bottom of the funnel 61A falls through the bottom slot 61B to feed the pile of granular material in the passage section 61C so as to maintain the angle of repose of the granular material in the pile; which action takes place all along the longitudinal extent of the bottom slot 61B, so as to unload the granular material substantially uniformly all along the longitudinal extent of the hopper 40A.

Likewise, the pneumatic unloading device 60B effects substantially uniform unloading of the granular material from the hopper 40B. Thus, the two hoppers 40A and 40B are unloaded substantially uniformly longitudinally therealong, thereby to effect substantially uniform longitudinal unloading of the lading chamber 30A.

From the foregoing explanation of the mode of operation of the device 60A, it is apparent that the rate of flow of the granular material from the bottom of the funnel 61A through the bottom slot 61B into the passage section 61C is self-regulating to match the rate of flow of the air current through the passage section 61D, is independent of the longitudinal direction of the air current through the passage section 61D, and is independent of the absolute pressure of the air current over a reasonably wide range of operating pressures extending both below and above atmospheric pressure. Furthermore, there is no possibility of obstructing or blocking the passage section 61D, since the pile of granular material in the passage section 61C stoppers the bottom slot 61B, when the passage section 61D is well open or unobstructed from end-to-end longitudinally thereof and between the conduits 81 and 82. Thus, there is no "starting-up" problem in the operation of the device 60A; and the operating pressure of the air current is in no way critical.

Further, the operating characteristic of the device 60A may be adjusted to match the slide characteristics of a wide variety of granular materials by appropriate adjustments of the shutter 75 prior to loading of the lading chamber 30A, in a ready and simple manner. In fact, it is convenient to calibrate the front or upper surface of the side wall 68, so as to facilitate such adjustment of the shutter 75. More important still, is the fact that after proper adjustment of the shutter 75 for a given granular lading, the shipper can ignore the question of the type of unloading system that is employed by the particular consignee of the cargo, since the shipper knows that the device 60A will operate quite satisfactorily with the preset adjustment of the shutter 75, regardless of whether a subatmospheric pressure unloading system or a superatmospheric pressure unloading system is subsequently employed to unload the body 30. This feature of the device 60A is very advantageous, since the railway hopper car 20 is thus rendered universal accommodating indiscriminate unloading thereof by the two standard unloading systems described above.

In a constructional example of the railway hopper car 20: the longitudinal distance over the strikers carried at the opposite ends of the centersill 21 is 50'9"; the longitudinal distance between the end walls 33 and 34 is 40'9"; the lateral distance between the side walls 31 and 32 is 9'11"; the vertical height between the rails of the track 24 and the sides of the roof 35 is 14'0"; and the bottom discharge outlets 50A and 50B in the hoppers 40A and 40B are each approximately 24'10½" x 1'6". In the bottom structure 40: each of the slope sheets 41 and 42 is disposed at an included angle of 48° to the horizontal plane; and each of the slope sheets 43, 44, 45 and 46 is disposed at an included angle of 52° to the horizontal plane. In the device 60A: the inside dimensions of the top opening into the casing 61 are 1'7½" x 25'0"; the vertical distance between the top of the collar 62 and the upper surface of the lowermost portion of the bottom wall 69 of the casing is 11½"; the radius of the arc of the inside surface of the bottom wall 68 is 6"; the side wall 67 slopes downwardly from the horizontal plane of the top of the collar 62 by an included angle of approximately 45°; the side wall 68 slopes downwardly from the horizontal plane of the top of the collar 62 by an included angle of approximately 45°; the maximum gap and the minimum gap of the bottom slot are respectively about 4" and about ¾"; and the inside diameter of each of the conduits 81 and 82 is 5".

In unloading polyethylene resin beads from the hopper 40A, a gap of ¾" was employed at the bottom slot 61B by adjustment of shutter 75, and it was discovered that suction unloading of the beads proceeded very rapidly and altogether satisfactorily with a pressure of —4#/in.$^2$ in one of the fixtures 84, 85 and with a pressure of —1#/in.$^2$ in the other of the fixtures 84, 85, whereby the pressure drop through the passage 61C–61D was 3#/in.$^2$. Employing the same 2" gap at the bottom slot 61B, it was discovered that pressure unloading of these beads proceeded very rapidly and altogether satisfactorily with a pressure of +4#/in.$^2$ in one of the fixtures 84, 85 and with a pressure of +1#/in.$^2$ in the other of the fixtures 84, 85, whereby the pressure drop through the passage 61C–61D was again 3#/in.$^2$. As a matter of fact, the positive pressure differential of 3#/in.$^2$ between the conduits 81, 82 produced an unloading rate that was somewhat higher than that produced by the negative pressure differential of 3#/in.$^2$; which phenomena is not altogether understood. In any event, both of these systems operate quite satisfactorily with only the relatively low differential pressure of 3#/in.$^2$ between the opposite ends of the passage 61C–61D, thereby establishing the feasibility of employing indiscriminately negative pressure and positive pressure unloading systems, both of only modest departure from atmospheric pressure, as explained above. Thus, the pneumatic unloading device 60A is operated by a relatively low pressure, either negative or positive, of the air current and relatively high velocity of the air moving therein, by virtue of the unobstructed open character of the passage section 61D through the lower portion of the casing 61 and longitudinally from end to end thereof, whereby the pick-up of the granular material from the confronting pile thereof is fundamentally by a mechanism of "entrainment" as distinguished from a mechanism of "entrapment," with the result that no slugs or accumulated masses of the granular material are carried or transported from the device 60A into the associated conduit system. This is very advantageous as it eliminates surging and shocking of the conduit system and insures a substantially constant delivery of the granular material as it is being unloaded from the body 30.

Recapitulating: in unloading the body 30, employing either a negative pressure system or a positive pressure system, the hatch covers 37 are retained in their closed positions; whereby the total air supplied into the devices 60A and 60B is via the series conduit system, including one of the fixtures 84, 85, whereby any complete emptying of one of the hoppers 40A, 40B, prior to complete emptying of the other of the hoppers 40A, 40B, does not produce an "air-short-circuit" through the empty hopper to disrupt complete emptying of the other hopper; whereby the devices 60A and 60B are operative always completely to empty the two hoppers 40A and 40B, even though one of the hoppers may be emptied somewhat ahead of the other. This arrangement is very advantageous, as the unloading of the body 30 thus requires no supervision whatsoever after operation of the unloading system is initiated.

The filling of the granular material into the body 30 may be accomplished in any convenient manner, when the fixtures 84 and 85 carry the associated closure and sealing caps. For example, one or more of the hatch covers 37 may be removed from the associated hatches 36; whereby the granular material may be simply poured into the open hatches 36, or the granular material may be blown into the open hatches 36 employing a conventional delivery tube of the air-blowing type. In any case, after filling of the hoppers 40A and 40B and the communicating lading chamber 30A, the hatch covers 37 are returned into their closed and sealed positions with respect to the associated hatches 36; whereby the interior of the body 30 is hermetically sealed after loading thereof, so as to exclude air, moisture, etc., from the lading contained in the body 30.

Referring to FIGS. 7 to 9, inclusive, the modified form of the railway hopper car 120 there illustrated is essentially the same as the railway hopper car 20 described above, except that a different conduit system is connected to the pneumatic unloading devices 160A and 160B respectively associated with the hoppers 140A and 140B, defined by the bottom structure 140 of the body 130; whereby only a brief description of the car 120 is required.

Specifically, the adjacent end walls of the casings of the respective devices 160A and 160B at one end of the body 130 are respectively connected by two conduits 181a and 181b to a common laterally extending header conduit 181c; and the adjacent end walls of the casings of the respective devices 160A and 160B at the other end of the body 130 are respectively connected by two conduits 182a and 182b to a common laterally extending header conduit 182c. The opposite ends of the header conduit 181c terminate in two fixtures 181x and 181y; and the opposite ends of the header conduit 182c terminate in two fixtures 182x and 182y; wherein the fixtures 181x and 182x are disposed adjacent to one side of the body 130 and the fixtures 181y and 182y are disposed adjacent to the other side of the body 130.

In the arrangement, the body 130 may be unloaded from either side thereof and at either end thereof, with the unloading via the devices 160A and 160B proceeding in parallel relation. For example, by removal of the caps from the fixtures 181x and 182y connections may be completed to the open fixtures 181x and 182y to cause a stream of air from the exterior to enter the header conduit 182c via the fixture 182y; which air stream is divided into two air currents respectively passing from the header conduit 182c via the conduits 182a and 182b in parallel relation and thence through the passages in the casings of the two devices 160A and 160B and then via the respective conduits 181a and 181b into the header conduit 181c. In the header conduit 181c, the two air currents mentioned are recombined to produce an air stream that then proceeds via the fixture 181x to the exterior. The other cross arrangements for unloading the body 130 adjacent to the other three corners thereof are obvious from the above description. Further, these unloading arrangements of the body 130 may be carried out employing indiscriminately the two fundamental unloading systems, as previously explained.

Referring to FIGS. 10 to 12, inclusive, the modified form of the railway hopper car 220 there illustrated is generally similar to the railway hopper car 20, whereby the car 220 comprises the corresponding elements 221, 230, 231, 232, 233, 234, 235, 236, and 237. In this case, the bottom structure 240 of the body 230 comprises the pair of laterally extending and longitudinally spaced-apart end slope sheets 241 and 242 the pair of longitudinally extending and laterally spaced-apart side slope sheets 243 and 244, and a pair of laterally extending and longitudinally spaced-apart upstanding connecting sheets 247 and 248. In the arrangement, the side slope sheets extend downwardly and laterally inwardly to the bottom discharge outlet 250A formed in the hopper 240A defined by the bottom structure 240. The ends of the bottom discharge outlet 250A are defined by the connecting sheets 247 and 248; and the elongated longitudinally extending collar 251A surrounds the bottom discharge outlet 250A. Thus, in this case, the bottom structure 240 defines the single hopper 240A communicating with the lading chamber 230A; and the single hopper 240A extends downwardly to the bottom discharge outlet 250A that is of elongated form extending longitudinally and directly below the central portion of the centersill 221 that projects longitudinally through the hopper 240A, as best shown in FIG. 11.

In order to complete the hopper 240A and to prevent contact by the granular material therein of the central portion of the centersill 221, a tube 249 is provided that encloses the central portion of the centersill 221, the opposite ends of the tube 249 being joined and sealed to the adjacent end slope sheets 241 and 242 through which the opposite end portions of the centersill 221 project. The tube 249 has an appropriate lateral cross section to prevent the accumulation of material upon the top thereof incident to the unloading of the granular material from the hopper 240A. To this end the opposite top portions of the tube 249 are sloped or pitched downwardly and then merge into downwardly directed side portions that ultimately join a bottom position positioned directly above the bottom discharge outlet 250A. This arrangement of the bottom structure 240 is advantageous in that only the single hopper 240A is provided in the body 230; and hopper 240A extends laterally around the tube 249 and the enclosed central portion of the centersill 221 and therebelow and opens into the single bottom discharge outlet 250A. Moreover, the volume of the single hopper 240A in the body 230 of the car 220 is somewhat larger than the composite volume of the two hoppers 40A and 40B in the body 30 of the car 20, when the bodies 230 and 30 have otherwise comparable dimensions.

Since the body 230 comprises the single hopper 240A having the single bottom discharge outlet 250A, only a single pneumatic unloading device 260A is required; which device 260A is detachably secured to the collar 251A in the manner previously explained in conjunction with the support of the corresponding devices 60A and 60B upon the respective hoppers 40A and 40B in the car 20. In this case, the opposite ends of the casing of the device 260A are connected to the conduits 281 and 283 that respectively terminate in the fixtures 284 and 285 respectively carried by the side walls 231 and 232.

The operation of the pneumatic unloading device 260A to effect unloading of the hopper 240A is the same as that previously described in conjunction with the operation of the device 40A to effect unloading of the hopper 40A and is not repeated in the interest of brevity.

In view of the foregoing, it is apparent that there has been provided a pneumatic unloading mechanism for granular material from a hopper, or the like, wherein the mechanism is of improved construction and arrangement, requiring no valve elements or other moving parts, in its operation, and wherein the mechanism is characterized by indiscriminate operation in a highly satisfactory manner, without requiring adjustment or setting thereof, when it is connected to a subatmospheric or suction system or when it is connected to a superatmospheric or positive pressure system. Also, an improved railway hopper car has been provided that includes an elongated longitudinally extending hopper that is of a length comparable to that of the lading chamber defined in the body of the car between the opposite ends thereof, and incorporating an elongated longitudinally extending pneumatic unloading mechanism of the character noted, whereby operation of the mechanism effects unloading of granular material from the lading chamber and substantially uniformly throughout the length thereof. It is an important feature of the hopper car that the entire lading chamber in the body thereof may be unloaded by a single such pneumatic unloading mechanism. Another important feature of the hopper car is that the entire lading chamber in the body thereof may be unloaded by a pair of such pneumatic unloading mechanisms arranged in lateral side-by-side relation. A further important feature of the hopper car is that either of the two foregoing features may be readily selected incident to the manufacture of the car by the corresponding selection of one of two simple and standard bottom constructions for the otherwise standard body thereof.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. A railway car comprising an elongated longitudinally extending body including bottom structure defining an elongated longitudinally extending communicating hopper and adapted to contain granular material, said hopper having a length commensurate with that of said body between the opposite ends thereof, said hopper having an elongated longitudinally extending bottom discharge outlet, an elongated longitudinally extending casing arranged below said hopper and detachably secured thereto, said casing including means defining an elongated longitudinally extending and downwardly tapered funnel in the upper portion thereof, said funnel having an elongated longitudinally extending top opening communicating with said bottom discharge outlet and an elongated longitudinally extending passage in the lower portion thereof, structure arranged in said casing and having an elongated longitudinally extending bottom slot therein, said passage including two laterally contiguous and communicating sections with a first of said passage sections disposed below said bottom slot and with a second of said passage sections disposed in laterally offset relation with said bottom slot and extending thereabove, said casing also including a pair of laterally extending and longitudinally spaced-apart end walls respectively closing the opposite ends of said funnel and the opposite ends of said passage, whereby granular material in said body proceeds therefrom through said hopper and via said bottom discharge outlet into said funnel and then falls through said bottom slot into said first passage section and piles-up therein into laterally confronting relation with said second passage section in unobstructed condition, said end walls having ports respectively formed therein and communicating with the adjacent ends of said second passage section, whereby an air current passing longitudinally through said second passage section entrains the laterally confronting granular material piled-up in said first passage section and thus transports the same therewith with the consequent pneumatic unloading of the granular material from said hopper, and a conduit system connected to said ports and arranged to effect the passing of an air current longitudinally through said second passage section and the consequent pneumatic unloading of the granular material from said hopper and said body.

2. A railway car comprising an elongated longitudinally extending underframe including a centersill, an elongated longitudinally extending body carried by said underframe and including bottom structure defining a pair of elongated longitudinally extending communicating hoppers arranged in lateral side-by-side relation and respectively disposed on opposite sides of said centersill and adapted to contain granular material, each of said hoppers having a length commensurate with that of said body between the opposite ends thereof, each of said hoppers having an elongated longitudinally extending bottom discharge outlet, a pair of elongated longitudinally extending casings respectively arranged below said hoppers and respectively detachably secured thereto, each of said casings including means defining an elongated longitudinally extending and downwardly tapered funnel in the upper portion thereof, each of said funnels having an elongated longitudinally extending top opening communicating with the adjacent bottom discharge outlet and an elongated longitudinally extending passage in the lower portion thereof, a pair of structures respectively arranged in said casings, each of said structures having an elongated longitudinally extending bottom slot therein, each of said passages including two laterally contiguous and communicating sections with a first of said passage sections disposed below the adjacent bottom slot and with a second of said passage sections disposed in laterally offset relation with the adjacent bottom slot and extending thereabove, each of said casings also including a pair of laterally extending and longitudinally spaced-apart end walls respectively closing the opposite ends of the adjacent funnel and the opposite ends of the adjacent passage, whereby granular material in said body proceeds therefrom in parallel through said hoppers and via said bottom discharge outlets into said funnels, whereby the granular material in each of said funnels falls through the adjacent bottom slot into the adjacent first passage section and piles-up therein into laterally confronting relation with the adjacent second passage section in unobstructed condition, said end walls having ports respectively formed therein and communicating with the adjacent ends of said passage sections, whereby an air current passing longitudinally through each unobstructed second passage section entrains the laterally confronting granular material piled-up in the adjacent first passage section and thus transports the same therewith with the consequent pneumatic unloading of the granular material from the adjacent hopper, and a conduit system connected to said ports and arranged to effect the passing of air currents longitudinally through said second passage sections and the consequent pneumatic unloading of the granular material from said hoppers and said body.

3. A railway car comprising an elongated longitudinally extending underframe including a centersill, an elongated longitudinally extending body carried by said underframe and including bottom structure defining a pair of elongated longitudinally extending communicating hoppers arranged in lateral side-by-side relation and respectively disposed on opposite sides of said centersill and adapted to contain granular material, each of said hoppers having a length commensurate with that of said body between the opposite ends thereof, each of said hoppers having an elongated longitudinally extending bottom discharge outlet, a pair of elongated longitudinally extending casings respectively arranged below said hoppers and respectively detachably secured thereto, each of said casings including means defining an elongated longitudinally extending and downwardly tapered funnel in the upper portion thereof, each of said funnels having an elongated longitudinally extending top opening communicating with the adjacent bottom discharge outlet and an elongated longitudinally extending passage in the lower portion thereof, a pair of structures respectively arranged in said casings, each of said structures having an elongated longitudinally extending bottom slot therein, each of said passages including two laterally contiguous and communicating sections with a first of said passage sections disposed below the adjacent bottom slot and with a second of said passage sections disposed in laterally offset relation with the adjacent bottom slot and extending thereabove, each of said casings also including a pair of laterally extending and longitudinally spaced-apart end walls respectively closing the opposite ends of the adjacent funnel and the opposite ends of the adjacent passage, whereby granular material in said body proceeds therefrom in parallel through said hoppers and via said bottom discharge outlets into said funnels, whereby the granular material in each of said funnels falls through the adjacent bottom slot into the adjacent first passage section and piles-up therein into laterally confronting relation with the adjacent second passage section in unobstructed condition, said end walls having ports respectively formed therein and communicating with the adjacent ends of said second passage sections, whereby an air current passing longitudinally through each unobstructed second passage section entrains the laterally confronting granular material piled-up in the adjacent first passage section and thus transports the same therewith with the consequent pneumatic unloading of the granular material from the adjacent hopper, first and second conduits respectively connected to the two ports disposed adjacent to one end of said body, and a third conduit respectively connecting together the two ports disposed adjacent to the other end of said body, whereby said three conduits named connect said second passage sections in series with each other.

4. A railway car comprising an elongated longitudinally extending underframe including a centersilll, an elongated longitudinally extending body carried by said underframe and including bottom structure defining a pair of elongated longitudinally extending communicating hoppers arranged in lateral side-by-side relation and respectively disposed on opposite sides of said centersill and adapted to contain granular material, each of said hoppers having a length commensurate with that of said body between the opposite ends thereof, each of said hoppers having an elongated longitudinally extending bottom discharge outlet, a pair of elongated longitudinally extending casings respectively arranged below said hoppers and respectively detachably secured thereto, each of said casings including means defining an elongated longitudinally extending and downwardly tapered funnel in the upper portion thereof, each of said funnels having an elongated longitudinally extending top opening communicating with the adjacent bottom discharge outlet and an elongated longitudinally extending passage in the lower portion thereof, a pair of structures respectively arranged in said casings, each of said structures having an elongated longitudinally extending bottom slot therein, each of said passages including two laterally contiguous and communicating sections with a first of said passage sections disposed below the adjacent bottom slot and with a second of said passage sections disposed in laterally offset relation with the adjacent bottom slot and extending thereabove, each of said casings also including a pair of laterally extending and longitudinally spaced-apart end walls respectively closing the opposite ends of the adjacent funnel and the opposite ends of the adjacent passage, whereby granular material in said body proceeds therefrom in parallel through said hoppers and via said bottom discharge outlets into said funnels, whereby the granular material in each of said funnels falls through the adjacent bottom slot into the adjacent first passage section and piles-up therein into laterally confronting relation with the adjacent second passage section in unobstructed condition, said end walls having ports respectively formed therein and communicating with the adjacent ends of said second passage sections, whereby an air current passing longitudinally through each unobstructed second passage section entrains the laterally confronting granular material piled-up in the adjacent first passage section and thus transports the same therewith with the consequent pneumatic unloading of the granular material from the adjacent hopper, a first conduit commonly connected to the two ports disposed adjacent to one end of said body, and a second conduit commonly connected to the two ports disposed adjacent to the other end of said body, whereby said two conduits named connect said second passage sections in parallel with each other.

5. A railway car comprising an elongated longitudinally extending underframe including a centersill, an elongated longitudinally extending body carried by said underframe and including bottom structure defining an elongated longitudinally extending communicating hopper and adapted to contain granular material, said hopper having a length commensurate with that of said body between the opposite ends thereof, an elongated longitudinally extending tube enclosing the central portion of said centersill and extending longitudinally through the lower portion of said hopper and above the bottom thereof and laterally inwardly from the sides thereof, the opposite ends of said tube being sealed to the respectively adjacent ends of said hopper so as to isolate the granular material contained in said hopper from contact with said centersill, said hopper having an elongated longitudinally extending bottom discharge outlet arranged below said tube, an elongated longitudinally extending casing arranged below said hopper and detachably secured thereto, said casing including means defining an elongated longitudinally extending and downwardly tapered funnel in the upper portion thereof, said funnel having an elongated longitudinally extending top opening communicating with said bottom discharge outlet and an elongated longitudinally extending passage in the lower portion thereof, structure arranged in said casing and having an elongated longitudinally extending bottom slot therein, said passage including two laterally contiguous and communicating sections with a first of said passage sections disposed below said bottom slot and with a second of said passage sections disposed in laterally offset relation with said bottom slot and extending thereabove, said casing also including a pair of laterally extending and longitudinally spaced-apart end walls respectively closing the opposite ends of said funnel and the opposite ends of said passage, whereby granular material in said body proceeds therefrom through said hopper and around said tube and via said bottom discharge outlet into said funnel and then falls through said bottom slot into said first passage section and piles-up therein into laterally confronting relation with said second passage section in unobstructed condition, said end walls having ports respectively formed therein and communicating with the adjacent ends of said second passage section, whereby an air current passing longitudinally through said second passage section entrains the laterally confronting granular material piled-up in said first passage section and thus transports the same therewith with the consequent pneumatic unloading of the granular material from said hopper, and a conduit system connected to said ports and arranged to effect the passing of an air current longitudinally through said second passage section and the consequent pneumatic unloading of the granular material from said hopper and said body.

6. The railway car set forth in claim 1, wherein the granular material piling-up in said first passage section stoppers said bottom slot when the rate of fall-through of the granular material through said bottom slot exceeds the rate at which the granular material is transported by the air current so that the overall rate of unloading of the granular material from said hopper is self-regulating to match the overall air current passing through said second passage section.

7. The railway car set forth in claim 1, wherein the pile-up of the granular material in said first passage section stoppers said bottom slot when no air current is passing through said second passage section so as to prevent obstruction by the granular material of said second passage section between said ports.

8. The railway car set forth in claim 1, wherein said funnel is disposed substantially in a vertical position and said passage is disposed substantially in a horizontal position.

9. The railway car set forth in claim 1, wherein said conduit system includes two sections respectively connected at the inner ends thereof to said two ports, and two fixtures respectively terminating the outer ends of said conduit sections, each of said fixtures being selectively connectible to an air suction main, whereby air may be drawn in an air current in either longitudinal direction through said second passage section to effect the pneumatic unloading of the granular material from said hopper and said body.

10. The railway car set forth in claim 1, wherein said conduit system includes two sections respectively connected at the inner ends thereof to said two ports, and two fixtures respectively terminating the outer ends of said conduit sections, each of said fixtures being selectively connectible to an air pressure main, whereby air may be blown in an air current in either longitudinal direction through said second passage section to effect the pneumatic unloading of the granular material from said hopper and said body.

11. A railway car comprising an elongated longitudinally extending body including bottom structure defining an elongated longitudinally extending communicating hopper and adapted to contain granular material, said hopper having a length commensurate with that of said body between the opposite ends thereof, said hopper having an elongated longitudinally extending bottom discharge outlet, and an elongated longitudinally extending casing arranged below said hopper and detachably secured thereto, said casing having an elongated longitudinally extending top opening communicating with said bottom discharge outlet, said casing including a pair of elongated longitudinally extending and laterally spaced-apart side walls respectively sloping downwardly and laterally inwardly from the opposite sides of said top opening to define therebetween and in the upper portion of said casing an elongated longitudinally extending and downwardly tapered funnel, the lower ends of said side walls being arranged in adjacent laterally spaced-apart relation to define therebetween and in the intermediate portion of said casing an elongated longitudinally extending bottom slot in said funnel, said casing also including an elongated longitudinally extending bottom wall, one side of said bottom wall projecting upwardly to join the lower end of one of said side walls and the other side of said bottom wall projecting upwardly to join the outer intermediate portion of the other of said side walls and the intermediate portion of said bottom wall extending laterally between the opposite sides thereof and below said bottom slot and below the lower end of said other side wall to envelope the lower end of said other side wall and to define an elongated longitudinally extending passage in the lower portion of said casing, said passage including two laterally contiguous and communicating sections with a first of said passage sections disposed below said bottom slot and with a second of said passage sections disposed in laterally offset relation with said bottom slot and extending above the lower end of said other side wall that is enveloped by said bottom wall, said casing also including a pair of laterally extending and longitudinally spaced-apart end walls respectively closing the opposite ends of said funnel and the opposite ends of said passage, whereby granular material in said body proceeds through said hopper and via said bottom discharge outlet into said funnel and then falls through said bottom slot onto said bottom wall and piles-up in said first passage section and into laterally confronting relation with said second passage section in unobstructed condition, said end walls having a pair of ports respectively formed therein and communicating with the adjacent ends of said second passage section, whereby an air current passing into one of said ports and out of the other of said ports and longitudinally through said unobstructed second passage section entrains the laterally confronting granular material piled-up in said first passage section and thus transports the same therewith with the consequent pneumatic unloading of the granular material from said hopper and said body.

12. The railway car set forth in claim 11, and further comprising a pair of fixtures respectively connected to said pair of ports, each of said fixtures being selectively connectible to an air suction main, whereby air may be drawn in an air current in either longitudinal direction through said second passage section to effect the pneumatic unloading of the granular material from said hopper and said body.

13. The railway car set forth in claim 11, and further comprising a pair of fixtures respectively connected to said pair of ports, each of said fixtures being selectively connectible to an air pressure main, whereby air under pressure may be blown in an air current in either longitudinal direction through said second passage section to effect the pneumatic unloading of the granular material from said hopper and said body.

14. The railway car set forth in claim 11, and further comprising an elongated longitudinally extending shutter carried by said other side wall and selectively adjustable with respect thereto in order to vary the effective lateral width of said bottom slot.

15. A device for unloading granular material from an elongated longitudinally extending hopper, or the like, through an elongated longitudinally extending bottom discharge outlet therein; said device comprising an elongated longitudinally extending collar adapted to be arranged below the hopper and detachably secured thereto in surrounding relation with the bottom discharge outlet therein, a pair of elongated longitudinally extending and laterally spaced-apart side walls respectively carried by the opposite sides of said collar and respectively sloping downwardly and laterally inwardly therefrom to define therebetween an elongated longitudinally extending and downwardly tapered funnel, said funnel having a top opening through said collar and adapted to receive the granular material from the bottom discharge outlet in the associated hopper, the lower ends of said side walls being arranged in adjacent laterally spaced-apart relation to define therebetween an elongated longitudinally extending bottom slot in said funnel, an elongated longitudinally extending bottom wall carried by said side walls, one side of said bottom wall projecting upwardly to join the lower end of one of said side walls and the other side of said bottom wall projecting upwardly to join the outer intermediate portion of the other of said side walls and the intermediate portion of said bottom wall extending laterally between the opposite sides thereof and below said bottom slot and below the lower end of said other said wall to envelope the lower end of said other side wall and to define an elongated longitudinally extending passage that includes two laterally contiguous and communicating sections, a first of said passage sections being disposed below said bottom slot and above the adjacent portion of said bottom wall, a second of said passage sections being disposed in laterally offset relation with said bottom slot and both below and laterally outwardly of the lower portion of said other side wall and above the adjacent portion of said bottom wall, whereby said second passage section is thus disposed between the lower portion of said other side wall and the adjacent portion of said bottom wall and extends above the lower end of said other side wall that is enveloped by said bottom wall, a pair of laterally extending and longitudinally spaced-apart end walls respectively carried by the opposite ends of said collar and respectively projecting downwardly therefrom to close both the opposite ends of said funnel and the opposite ends of said passage, whereby granular material in said funnel falls through said bottom slot onto said bottom wall and piles-up in said first passage section into laterally confronting relation with said second passage and stoppers said bottom slot without obstructing said second passage between the opposite ends thereof, and a pair of conduits respectively carried by said end walls and communicating with the adjacent ends of said second passage section, whereby an air current passing from one of said conduits longitudinally through said unobstructed second passage section and out of the other of said conduits entrains the laterally confronting granular material piled-up in said first passage section and thus transports the same therewith with the consequent pneumatic unloading of the granular material from the associated hopper.

16. A railway car comprising hopper structure adapted to contain granular material and having a bottom discharge outlet, a casing arranged below said hopper and detachably secured thereto, said casing having a top opening communicating with said bottom discharge outlet, whereby granular material from said hopper proceeds through said bottom discharge outlet into said casing, said casing including a pair of opposed end walls, a pair of conduits respectively carried by said end walls and communicating at the inner ends thereof with the adjacent ends of said casing, a pair of fixtures respectively carried by the outer ends of said conduits, each of said fixtures accommodating the connection thereto of an air suction main, whereby atmospheric air may be drawn into either one of said conduits and then passed longitudinally through said casing in an air current and thence through the other of said conduits into the air suction main connected thereto so that the air current passing through said casing is at subatmospheric pressure, each of said fixtures also accommodating the connection thereto of an air pressure main, whereby air from the air pressure main may be blown into the connected one of said conduits and then passed longitudinally through said casing in an air current and thence through the other of said conduits so that the air current passing through said casing is at superatmospheric pressure, and means housed in said casing and responsive to the passing of an air current therethrough and non-responsive to subatmospheric pressure or superatmospheric pressure thereof for entraining into the air current and for transporting therewith the granular material in said casing, thereby to effect pneumatic unloading of the granular material from said hopper through said casing, and whereby the pneumatic unloading aforesaid may be carried out employing indiscriminately either the associated air suction main or the associated air pressure main.

17. The railway car set forth in claim 16, wherein said means housed in said casing for entraining into the air current and for transporting therewith the granular material in said casing requires no adjusting or adapting thereof in the indiscriminate employment of the associated air suction main or the associated air pressure main.

18. A railway car comprising an elongated longitudinally extending body including bottom structure defining an elongated longitudinally extending communicating hopper and adapted to contain granular material, said hopper having a length commensurate with that of said body between the opposite ends thereof, said hopper having an elongated longitudinally extending bottom discharge outlet, said bottom discharge outlet having a length commensurate with that of the bottom of said hopper, and elongated longitudinally extending casing arranged below said hopper and detachably secured thereto, said casing having an elongated longitudinally extending top opening communicating with said bottom discharge outlet, said top opening having a length commensurate with that of said bottom discharge outlet, whereby granular material from said body proceeds through said hopper and via said bottom discharge outlet and said top opening into said casing, said casing including a pair of elongated longitudinally extending and laterally spaced-apart side walls and an elongated longitudinally extending bottom wall and a pair of laterally extending and longitudinally spaced-apart end walls, a pair of conduits respectively disposed below the opposite ends of said body and respectively carried by said end walls and respectively communicating at the inner ends thereof with the adjacent opposite ends of said casing, whereby a current of air may be passed from one of said conduits longitudinally through said casing and into the other of said conduits, and means housed in said casing and responsive to the passing of an air current longitudinally therethrough for entraining into the air current and for transporting therewith the granular material in said casing, thereby to effect pneumatic unloading of the granular material from said body through said hopper and via said casing to the exterior.

References Cited by the Examiner
UNITED STATES PATENTS

| | | | |
|---|---|---|---|
| 1,889,562 | 11/32 | Moulthrop | 214—83.32 |
| 2,190,724 | 2/40 | McBride | 214—83.32 |
| 2,503,129 | 4/50 | Pautz | 214—83.26 X |
| 2,675,274 | 4/54 | Engelhart | 214—83.28 X |
| 2,770,376 | 11/56 | Zinn | 214—83.32 |
| 3,050,342 | 8/62 | Koranda et al. | 302—52 |
| 3,069,207 | 12/62 | Borger et al. | 302—52 |
| 3,088,777 | 5/63 | Aller | 302—52 |

HUGO O. SCHULZ, *Primary Examiner.*

GERALD M. FORLENZA, *Examiner.*